US011580461B2

(12) United States Patent
Adcock et al.

(10) Patent No.: US 11,580,461 B2
(45) Date of Patent: Feb. 14, 2023

(54) SYSTEM FOR ADVISING CONSUMERS ON OPTIMAL PEDESTRIAN ROUTES BASED ON TRANSACTION HISTORY

(71) Applicant: Capital One Services, LLC, McLean, VA (US)

(72) Inventors: Lee Adcock, Midlothian, VA (US); Ana Cruz, Arlington, VA (US); Christopher Camenares, Falls Church, VA (US); Nahid Farhady Ghalaty, Fairfax, VA (US)

(73) Assignee: Capital One Services, LLC, McLean, VA (US)

( * ) Notice: Subject to any disclaimer, the term of this patent is extended or adjusted under 35 U.S.C. 154(b) by 30 days.

(21) Appl. No.: 16/866,695

(22) Filed: May 5, 2020

(65) Prior Publication Data
US 2021/0350288 A1  Nov. 11, 2021

(51) Int. Cl.
*G06Q 10/02* (2012.01)
*G01C 21/20* (2006.01)
(Continued)

(52) U.S. Cl.
CPC .......... *G06Q 10/02* (2013.01); *G01C 21/206* (2013.01); *G06Q 10/1095* (2013.01); *G06Q 20/045* (2013.01); *G06Q 10/047* (2013.01)

(58) Field of Classification Search
CPC .. G06Q 10/02; G06Q 10/1095; G06Q 20/045; G01C 21/206
(Continued)

(56) References Cited

U.S. PATENT DOCUMENTS 8,924,393 B1  12/2014 Channakeshava
9,863,778 B2   1/2018 Anderson et al.
(Continued)

FOREIGN PATENT DOCUMENTS

AU  2018202803 B2 *  1/2021  .......... G01C 21/206

OTHER PUBLICATIONS

Yuan, Yaoxuan. "Crowd Monitoring Using Mobile Phones." Aug. 1, 2014. 2014 Sixth International Conference on Intelligent Human-Machine Systems and Cybernetics. pp. 261-264. (Year: 2014).*
(Continued)

*Primary Examiner* — Jeff Zimmerman
*Assistant Examiner* — Hunter A Molnar
(74) *Attorney, Agent, or Firm* — Banner & Witcoff, Ltd.

(57) ABSTRACT

Aspects described herein may provide determination of a pedestrian route for a user to reach a seating area inside of a venue. Financial transaction data of the user may be reviewed to determine the user purchased one or more tickets to an event at the venue. Information regarding the event or the venue may be determined including seating charts for the venue and whether the tickets are for assigned or unassigned seats. Crowd densities inside and outside of the venue may be determined. The pedestrian route may be determined based on the crowd densities, number of tickets, and type of seating. The route may be updated as conditions change including any change to the crowd densities or change to seating availability. The route may increase a likelihood that the user reaches the seating area prior to a start of the event, and in a less stressful manner.

20 Claims, 6 Drawing Sheets

(51) Int. Cl.
  *G06Q 20/04* (2012.01)
  *G06Q 10/10* (2012.01)
  *G06Q 10/1093* (2023.01)
  *G06Q 10/04* (2012.01)
  *G06Q 10/047* (2023.01)

(58) Field of Classification Search
  USPC .......................................................... 705/5
  See application file for complete search history.

(56) References Cited

U.S. PATENT DOCUMENTS

| | | | |
|---|---|---|---|
| 2011/0208601 A1* | 8/2011 | Ferguson | G06Q 40/02 |
| | | | 705/16 |
| 2014/0032377 A1 | 1/2014 | Oxenham et al. | |
| 2016/0091328 A1 | 3/2016 | Ould-Ahmen-Vall et al. | |
| 2016/0162810 A1* | 6/2016 | Howe | G06Q 50/14 |
| | | | 705/5 |
| 2016/0300151 A1 | 10/2016 | Bostick et al. | |
| 2016/0370463 A1* | 12/2016 | Schwager | G01S 13/867 |
| 2018/0268321 A1* | 9/2018 | Leafty | G06Q 10/02 |
| 2018/0349808 A1 | 12/2018 | Sahadi | |
| 2021/0063184 A1* | 3/2021 | Heinisch | G08G 1/096866 |

OTHER PUBLICATIONS

Wang, Ching-Sheng, et al. "An augmented reality mobile navigation system supporting iBeacon assisted location-aware service." Aug. 11, 2016. 2016 International Conference on Applied System Innovation (ICASI). pp. 1-4. (Year: 2016).*

* cited by examiner

SYSTEM FOR ADVISING CONSUMERS ON OPTIMAL PEDESTRIAN ROUTES BASED ON TRANSACTION HISTORY

FIELD OF USE

Aspects of the disclosure relate generally to routing a pedestrian. More specifically, aspects of the disclosure provide techniques for providing a pedestrian route based on financial transaction information.

BACKGROUND

An attendee of an event at a venue may be overwhelmed by the challenges of navigating crowds outside of the venue to reach an entrance of the venue. Once inside the venue, the attendee may be similarly overwhelmed by the layout of the venue and crowds inside of the venue when attempting to locate an accommodating seating area. These challenges may be exacerbated if the venue is a relatively large venue (e.g., a stadium, a large arena, etc.), if the attendee is not familiar with the venue (e.g., a first time attendee at the venue), and/or if the attendee has unassigned seats to the event.

The attendee risks missing a start of the event if the attendee is unable to find an appropriate seating area in an efficient manner Relying on conventional routing systems is ineffective as many conventional routing systems are limited to only routing an individual to an area near the venue and do not advise the attendee on how to enter and then find seating within the venue.

Aspects described herein may address these and other problems, and generally improve the reliability and efficiency of routing an individual from outside of a venue to a seating area inside of a venue.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may provide a pedestrian route for an individual to enter a venue and to reach a seating area within the venue that may accommodate the individual. According to some aspects, these and other benefits may be achieved by reviewing financial transaction data for the individual to determine (e.g., automatically) a time and a place of an event that the individual plans to attend and to provide an optimal pedestrian route for the individual that accounts for crowd densities in and around the venue.

More particularly, some aspects described herein may provide a computer-implemented method for determining a purchase of one or more tickets to an event. The purchase of the one or more tickets to the event may be determined by reviewing financial transaction data associated with an individual that purchased the one or more tickets. Event information may be determined based on the purchase of the one or more tickets. The event information may include information on a venue for the event and/or information related to the event. Based on the determined event information, an initial location of the individual within a predetermined distance of the venue on the date of the event may be determined. A first crowd density outside of the venue may be determined. A second crowd density inside of the venue may be determined. Based on the first and second crowd densities and based on a determination of a seating area that may accommodate the individual, a pedestrian route for the individual may be determined that routes the individual from the initial location to the seating area for the individual. The determined pedestrian route may be provided on a user computing device associated with the individual and may be updated as the individual traverses the pedestrian route or as the pedestrian route is modified to account for changes in crowd densities or available seating areas.

Corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for determining a pedestrian route for an individual. The pedestrian route may provide a first portion of a route for entering a venue and a second portion of the route for locating a seating area within the venue. Based on a review of financial transaction data for the individual, a purchase of one or more tickets to an event at the venue may be determined. Information related to the event and the venue may be determined. When the individual is ready to attend the event, the pedestrian route may be provided to the individual. The pedestrian route may account for crowd densities inside and outside of the venue and may account for whether seats purchased for the event are assigned or unassigned. The pedestrian route may also account for whether the individual is meeting other individuals at the event. The pedestrian route may be provided to the individual on a computing device and may be updated as the individual traverses the pedestrian route or as crowd densities or venue circumstances change.

Before discussing these concepts in greater detail, however, several examples of a computing device that may be used in implementing and/or otherwise providing various aspects of the disclosure will first be discussed with respect to FIG. 1.

Figure 1:
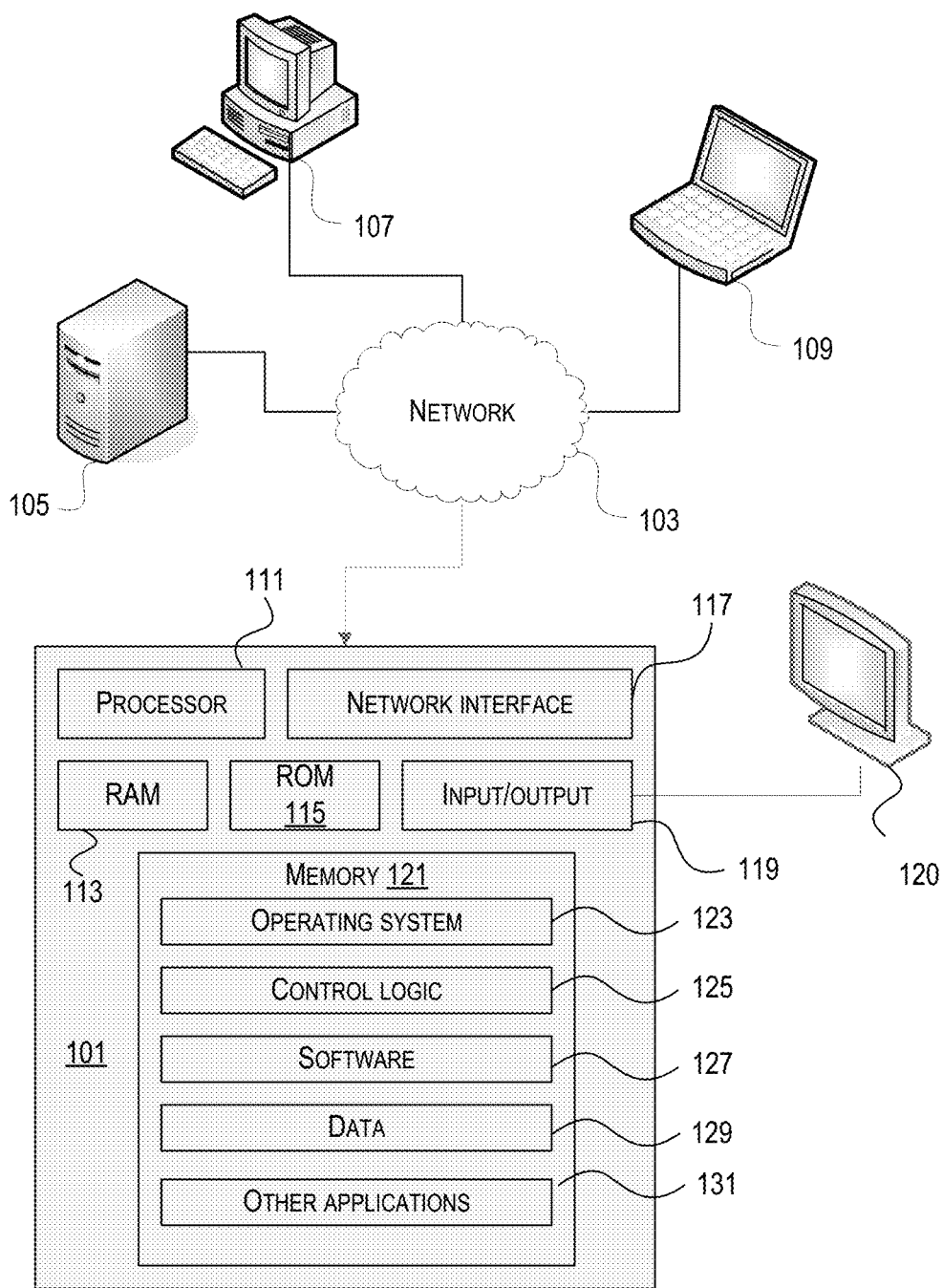
FIG. 1 depicts an example of a computing device that may be used in implementing one or more aspects of the disclosure in accordance with one or more illustrative aspects discussed herein.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, local area networks (LANs), wireless networks, personal networks (PAN), and the like. Network 103 is for illustration purposes and may be replaced with fewer or additional computer networks. A LAN may have one or more of any known LAN topologies and may use one or more of a variety of different protocols, such as Ethernet. Devices 101, 105, 107, 109 and other devices (not shown) may be connected to one or more of the networks via twisted pair wires, coaxial cable, fiber optics, radio waves, or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, software 127, data 129, and other applications 131. Control logic 125 may be incorporated in and may be a part of software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125 and/or software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Having discussed several examples of computing devices which may be used to implement some aspects as discussed further below, discussion will now turn to an example for advising an individual as to a pedestrian route (e.g., an optimal pedestrian route) for accessing a venue and locating an appropriate seating area.

Figure 2:
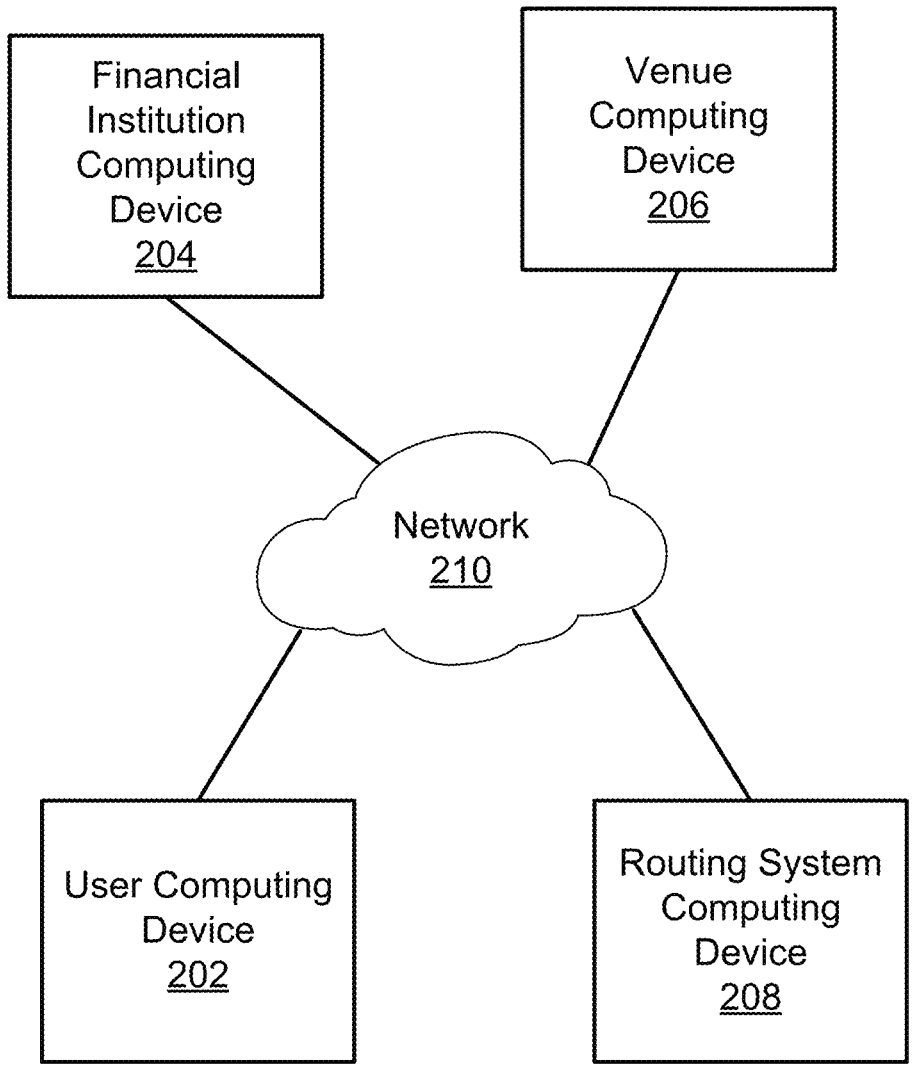
FIG. 2 depicts a system for advising a user on a pedestrian route based on a financial transaction history of the user according to one or more aspects of the disclosure.

FIG. 2 illustrates a system 200 for advising a user or customer on a pedestrian route based on a financial transaction history of the user in accordance with one or more aspects described herein. The system 200 may include a user computing device 202, a financial institution computing device 204, a venue computing device 206, a routing system computing device 208, and a network 210. The system 200 may be considered a routing system or pedestrian routing system.

The user computing device 202 may be any type of computing device including any computing device depicted and described in relation to FIG. 1. In various embodiments, the user computing device 202 may be, for example, a smartphone, a laptop, or a tablet. In various embodiments, the user computing device 202 may be a portable wireless device. The user computing device 202 may be associated with a user that conducts financial transactions using the user computing device 202 including, for example, purchasing one or more tickets to an event. The user computing device may include a display screen for displaying textual and/or graphical information such as, for example, information relating to a pedestrian route as described herein.

The financial institution computing device 204 may be any type of computing device including any computing device depicted and described in relation to FIG. 1. In various embodiments, the financial institution computing device 204 may be associated with a financial institution. In various embodiments, the financial institution computing device 204 may represent one or more computing devices and/or a computer network associated with the financial institution. In various embodiments, the financial institution computing device 204 may include one or more computers, servers, and/or databases. The financial institution may be a bank, credit union, credit card company, or any other type of financial institution that may provide one or more financial accounts to the user.

In various embodiments, the user associated with the user computing device 202 may have one or more financial accounts with the financial institution. In various embodiments, the user associated with the user computing device 202 may have a checking account, a savings account, a line of credit, and/or a credit card account provided through the financial institution associated with the financial institution computing device 204. In general, the user associated with the user computing device 202 may have any type of financial account with the financial institution associated with the financial institution computing device 204.

In various embodiments, the user computing device 202 may be used to conduct a financial transaction funded by an account maintained by the financial institution computing device 204. The financial institution computing device 204 may store information related to the financial transaction including, for example, information relating to any of the following: any parties related to the transaction, an individual or entity that conducted or initiated the financial transaction (e.g., the purchaser), an individual or entity that was the recipient of the financial transaction (e.g., the seller), a financial account used to fund the transaction, a financial account that received the funds, an item or service purchased through the financial transaction, a time and/or a date of the financial transaction, and an amount (e.g., dollar amount) of the financial transaction.

As an example, the user associated with user computing device 202 may purchase one or more tickets to an event and the transaction information related to the purchase may be generated and/or stored by the financial institution computing device 204. The event may be any type of event including, for example, a concert, a play, a sporting event, a movie, or any type of performance. The information stored by the financial computing device 204 may include and/or indicate the event, the number of tickets or seats purchased, the purchase price, the venue, an address of the venue or entity providing the event, a location of the event, a date of the event, and/or a time of the event.

The venue computing device 206 may be any type of computing device including any computing device depicted and described in relation to FIG. 1. In various embodiments, the venue computing device 206 may be associated with an event venue such as, for example, a movie theater, a concert hall, a performance theater, an amphitheater, a stadium, or an arena. In various embodiments, the venue computing device 206 may represent one or more computing devices and/or a computer network associated with the event venue. In various embodiments, the venue computing device 204 may include one or more computers, servers, and/or databases.

In various embodiments, the venue computing device 206 may include one or more databases for storing information relating to offered events such as a type of an event, the times and/or dates of the event, the number of tickets available, the number of tickets purchased, and/or any other information related to any offered or provided event. In various embodiments, the venue computing device 206 may include one or more databases for storing information related to a particular transaction such as information identifying a customer that bought tickets to an event, the type of seating (e.g., assigned or unassigned seats) and/or seat assignments, the purchase price, the number of seats and/or tickets purchased, and the date and/or times of the event. In various embodiments, the venue computing device 206 may include one or more databases for storing information related to the venue such as the address of the venue, the operating times of the venue, seating arrangements or maps for the venue, and/or events offered at the venue.

The routing system computing device 208 may be any type of computing device including any computing device depicted and described in relation to FIG. 1. In various embodiments, the routing system computing device 204 may represent one or more computing devices and/or a computer network and/or may include one or more computers, servers, and/or databases. The routing system computing device 208 may be associated with a routing system or advising system that may advise a user as to a pedestrian route for entering a venue and/or locating a seating area within the venue (e.g., either assigned seats or unassigned seats within the venue) as described herein. The routing system computing device 208 may be capable of providing information to the user computing device 202 that may allow audible, textual, and/or graphical information relating to the pedestrian route to be presented by the user computing device 202.

The network 210 may be any type of communications and/or computer network. The network 210 may include any type of communication mediums and/or may be based on any type of communication standards or protocols. The network 210 may represent an instance of the network 103 FIG. 1. The network 210 communicatively couples the user computing device 202, the financial institution computing device 204, the venue computing device 206, and the routing system computing device 208 to one another to enable data or other information to be shared by each component depicted in FIG. 2.

In various embodiments, the financial institution computing device 204 and the routing system computing device 208 may be associated with different entities (e.g., a financial institution and a route advising system, respectively). In various embodiments, the financial institution computing device 204 and the routing system computing device 208 may be owned or controlled by the same entity. In various embodiments, the financial institution computing device 204 and the routing system computing device 208 may be part of the same network and/or may include the same components (e.g., the financial institution computing device 204 and the routing system computing device 208 may be the same device, may share components, or may be part of the same computer network of the financial institution).

In various embodiments, the user associated with the user computing device 202 may interact with the user computing device 202 to conduct a transaction to purchase one or more tickets to an event. The event may be any type of event and may be scheduled to take place at the venue associated with the venue computing device 206. The transaction may be funded and/or facilitated by a financial account of the user that is maintained and/or managed by the financial institution associated with the financial institution computing device 204. Information related to the transaction may be stored by the user computing device 202, the financial institution computing device 204, and/or the venue computing device 206. The same or different information related to the transaction may be stored by the user computing device 202, the financial institution computing device 204, and/or the venue computing device 206.

After the transaction is conducted, the routing system computing device 208 may review financial transaction data associated with the transaction. The data associated with the transaction may relate to the purchase of the one or more tickets. The data associated with the transaction may be stored by the user computing device 202, the financial institution computing device 204, and/or any other computing device that may be accessible to the routing system computing device 208. In various embodiments, the routing system computing device 208 may be triggered to review the financial transaction data associated with the transaction—for example, automatically triggered based on a periodic review of financial transaction data related to the user or triggered based on a specific request of the user.

In various embodiments, the routing system computing device 208 may review financial data associated with the user and/or a financial account associated with the user (e.g., a credit card). Based on a review of the financial data, the routing system computing device 208 may identify the transaction related to the purchase of the one or more tickets. The user may agree or provide, to the routing system computing device 208, access to any financial data associated with the user. Financial data associated with the user may be stored on the user computing device 202 and/or the financial institution computing device 204.

Based on identifying the transaction related to the purchase of the one or more tickets, the routing system computing device 208 may determine information related to the event for which the one or more tickets were purchased. In various embodiments, the information related to the event may include, for example, a date of the event, a time of the event (e.g., time of day for the event), a venue for the event, and/or a number of seats relating to the purchase of the one or more tickets to the event. Further, the information may include information as to whether the seats are assigned seats or unassigned seats. The routing system computing device 208 may obtain the information based on input from the user (e.g., information provided by the user), from information provided by the venue computing device 206, from information provided by the financial institution computing device 204, and/or from other sources.

In various embodiments, the routing system computing device 208 may determine event information based on a billing address associated with the purchase of the tickets to the event, which may be determined by a review of the user's financial transaction history and/or data. In various embodiments, the routing system computing device 208 may determine event information based on a transactional code associated with the purchase of the tickets to the event, which may be determined by a review of the user's financial transaction history and/or data. In various embodiments, the determined billing address or determined transactional code may identify the venue of the event, thereby allowing the routing system computing device 208 to determine to obtain event information from the venue computing device 206 (or any other source providing information on the event).

In various embodiments, the routing system computing device 208 may determine event information based on the user of the user computing device 202 providing the event information (e.g., number of tickets purchased, event, venue, data, etc.) directly to the routing system computing device 208 (e.g., by entering such information into an application (app) operating on the user computing device 202). In various embodiments, the routing system computing device 208 may determine event information based on any information stored on the user computing device 202 (e.g., based on information on a calendar app on the user computing device 202 that indicates the user is attending an event).

After determining information related to the event, the routing system computing device 208 may monitor the date of the event. On the day of the event, the routing system computing device 208 may monitor the location of the user. In various embodiments, the routing system computing device 208 may receive location information from the user computing device 202 (e.g., based on GPS information shared with the routing system computing device 208 and/or based on an app stored on the user computing device 202 that is associated with the routing system service).

When the routing system computing device 208 determines that the user (e.g., via location information associated with the user computing device 202) is near the venue on the day of the event, then the routing system computing device 208 may determine a pedestrian route for the user to access and enter the venue. In various embodiments, the routing system computing device 208 may determine if the user is within a predetermined distance of the venue where the event will occur. Once the user is within the predetermined distance of the venue, the routing system computing device 208 may determine the pedestrian route that enables the user to enter the venue and find seats associated with the user prior to the start of the event.

In various embodiments, to determine the pedestrian route to access and/or to approach the venue, the routing system computing device 208 may determine a density of a crowd in close proximity to the venue. As an example, the routing system computing device 208 may determine an estimate of a density of a crowd (e.g., crowd of attendees) outside of the venue that may be assembling in an attempt to enter the venue. In various embodiments, an estimated density of the crowd outside of the venue (e.g., surrounding the venue or in proximity to one or more entrances of the venue) may be determined based on data provided by electronic devices associated with members of the crowd. For example, other attendees to the event may possess one or more electronic devices that provide location information directly or indirectly to the routing system computing device 208. In various embodiments, the routing system may include an app operating on electronic devices possessed by members of the crowd outside of the venue. The app associated with the routing system may report location information for the device on which it operates to the routing system computing device 208.

In various embodiments, to determine the pedestrian route within the venue, the routing system computing device 208 may determine a density of a crowd in within the venue. As an example, the routing system computing device 208 may determine an estimate of a density of a crowd (e.g., crowd of attendees) inside of the venue that may be seated within the venue and/or moving around the venue to locate seats. In various embodiments, an estimated density of the crowd inside of the venue (e.g., surrounding the venue or in proximity to one or more entrances of the venue) may be determined based on data provided by electronic devices associated with members of the crowd, similar to the manner in which location information for the crowd outside of the venue may be determined.

For example, other attendees to the event may possess one or more electronic devices that provide location information directly or indirectly to the routing system computing device 208 (e.g., via the app related to the routing system). In various embodiments, sensors (e.g., motion sensors or other sensors) may be used to estimate a density of the crowd within the venue. In various embodiments, estimates of a density of a crowd by the routing system computing device 208 may include estimating a number of people in the crowd and a concentration or location of the people within the crowd.

After estimating the density of the crowd outside of the venue and within the venue, the routing system computing device 208 may determine a route for the user from the user's current location to a seating area within the venue. The route may be a pedestrian route. The route may include a first route (or portion) from the user's current location to an entrance of the venue. The route may also include a second route (or portion) from the entrance to a seating area that may accommodate the user, including the number of seats associated with the user.

The routing system computing device 208 may determine the route based on the density of the crowd outside of the venue (e.g., a first crowd density or estimate thereof) and/or based on the density of the crowd inside of the venue (e.g., a second crowd density or estimate thereof). The routing system computing device 208 may determine the route based on a starting time of the event and a current location of the user. In various embodiments, the routing system computing device 208 may access information on the venue (e.g., from the venue computing device 206 or other source) including, for example, a map of the venue, a seating chart of the venue, and/or information on accessible entrances and pathways of the venue.

In various embodiments, the routing system computing device 208 may determine that a first entrance, located further from the user than a second entrance located closer to the user, is preferable for entering the venue. For example, the second entrance, even though physically closer to the user, may have a relatively large crowd density near it making entering the second entrance time consuming. The first entrance, even though located further from the user physically, may have a relatively small crowd density near it making entering the first entrance less time consuming. Accordingly, in various embodiments, routing system computing device 208 may determine the route in a manner that directs the user to walk to an entrance of the venue that is not the nearest entrance to the user. In doing so, the routing system computing device 208 may increase a likelihood that the user reaches a seating area prior to a start of the event and in a less stressful manner.

In various embodiments, the routing system computing device 208 may determine the route based on whether the user has one or more assigned seats or one or more unassigned seats. For example, if the user has unassigned seats to the event, the routing system computing device 208 may use information regarding the crowd density inside of the venue and information on seating within the venue to determine a seating area that may accommodate the user (e.g., the number of tickets or seats purchased by the user). The routing system computing device 208 may determine the route from the entrance of the venue to the seating area determined to accommodate the user.

The system 200 enables a user to quickly and efficiently reach a location within a venue to attend an event. By accounting for crowd density inside and outside of the venue and by accounting for the number of seats associated with the user and the type of seating (e.g., assigned seats or unassigned seats), the user may reach a seating area within the venue in a less rushed and hurried manner, without the scramble that often accommodates attending a crowded event to reach a seat before the event begins. In doing so, the system 200 may provide a route that includes an entrance to the venue or a pathway inside of the venue of which the user was not aware.

Figure 3:
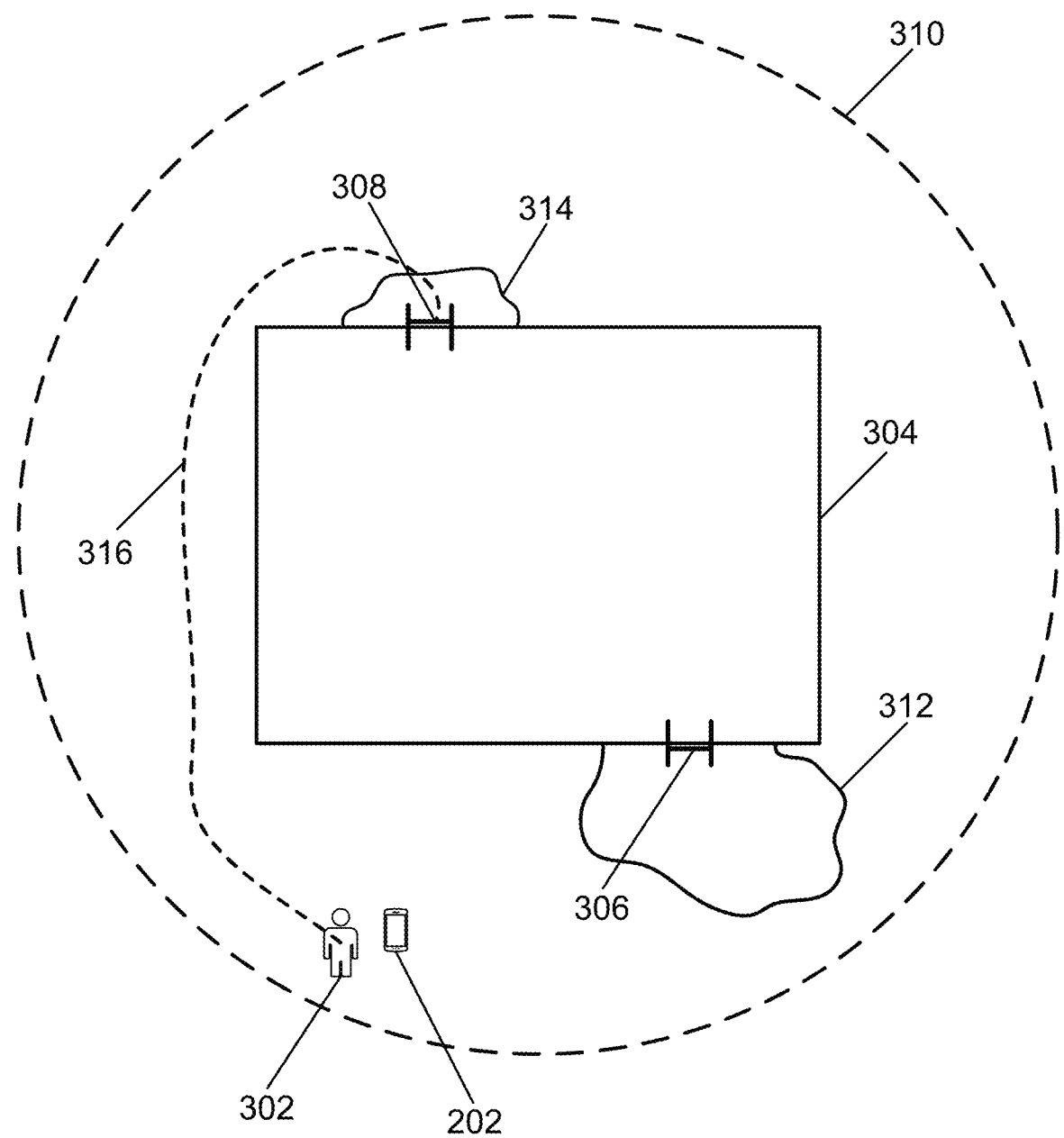
FIG. 3 depicts a determination of a first component of a pedestrian route according to one or more aspects of the disclosure.

FIG. 3 illustrates a determination of a first component of a pedestrian route based on a financial transaction history of the user in accordance with one or more aspects described herein. FIG. 3 shows a user 302 in proximity to a venue 304. The user 302 may be the user associated with the user computing device 202. The venue 304 may be the venue associated with the venue computing device 206.

The routing system described herein (e.g., the system 200 and/or the routing system computing device 208) may determine information regarding the venue 304. Information regarding the venue 304 may include information regarding a location of a first entrance 306 and a second entrance 308. The second entrance 308 may be located further away from the user than the first entrance 306.

The system 200 may determine that the user 302 is located within a predetermined distance 310 from the venue on the day of the event for which the user 302 has purchased tickets. After detecting that the user 302 is within the predetermined distance 310 on the day of the event at a time relatively close to a starting time of the event (e.g., within a threshold amount of time prior to a start of the event), the system 200 may determine a density of a crowd (e.g., a crowd of attendees) outside of the venue 304 (e.g., within relatively close proximity to the venue 304).

In various embodiments, the system 200 may determine that a first crowd 312 is located near the first entrance 306. The system 200 may determine a density of the first crowd 312—for example, a number of people located near the first entrance 306. The system 200 may determine the crowd density of the crowd 312 based on the techniques described in relation to FIG. 2. In various embodiments, the system 200 may determine that a second crowd 314 is located near the second entrance 308. The system 200 may determine a density of the second crowd 314—for example, a number of people located near the second entrance 308. The system 200 may determine the crowd density of the crowd 314 based on the techniques described in relation to FIG. 2.

In various embodiments, the system 200 may determine a current or initial location of the user 302. The system 200, after determining the densities of the crowds 312 and 314 near the first and second entrances 306 and 308, respectively, may determine a first component of a pedestrian route 316 for the user 302. The first component of the pedestrian route 316 may be determined based on the current location of the user 302, the density of any crowd outside of the venue (e.g., the densities of the crowds 312 and 314 near the first and second entrances 306 and 308, respectively), and the starting time of the event.

In various embodiments, the first component of the pedestrian route 316 may also be determined based on any automobile and/or pedestrian traffic patterns or flows in proximity to the venue 304. The system 200 may determine information on typical pedestrian or automobile traffic patterns near the venue 304 and may monitor changes to any traffic patterns leading up to the event. In various embodiments, the system 200 may monitor a total number of tickets purchased for the event. In various embodiments, the system may monitor or estimate changes to any traffic patterns based on traffic patterns associated with the venue for past events and/or the total number of tickets purchased for the event.

As shown in FIG. 3, the system 200 may determine that the user 302 should enter the venue 304 using the second entrance 308, even though the second entrance 308 is located further from the user 302 than the first entrance 306. The system 200 may make such a determination, for example, if the density of the first crowd 312 is relatively large and may cause entering the venue 304 to be relatively time consuming (e.g., to a degree that the user 302 may miss or likely miss the start of the event). Accordingly, the system 200 may advise or suggest to the user 302 to enter the second entrance 308 to increase a likelihood of the user 302 entering the venue 304 and reaching the seats of the user 302 in time for the start of the event. In many situations, the user 302 may be unaware of the second entrance 308. Under such a scenario, the user 302, without use of the system 200, may miss the start of the event if the user decides to navigate through the first crowd 312 to enter the venue 304 at the first entrance 306.

The system 200 may obtain information regarding any traffic patterns, closed off areas, accessible areas, inaccessible areas or entrances, and/or any other information that may influence an ability of the user 302 to traverse the first component of the pedestrian route 316. Such information may be used to generate the first component of the pedestrian route 316.

In various embodiments, the routing system computing device 208 may provide information regarding the first component of the pedestrian route 316 to the user computing device 202. The information provided to the user computing device 202 may allow the user computing device 202 to audibly, textually, and/or graphically convey the first component of the pedestrian route 316 to the user 202. In various embodiments, the first component of the pedestrian route 316 may be displayed to the user as an overhead view (e.g., as a path overlaid with a map showing the venue 302 substantially as shown in FIG. 3). In various embodiments, the first component of the pedestrian route 316 may be displayed to the user as a point-of-view (POV) (e.g., looking forward or straight ahead from the perspective of the user 302).

In various embodiments, the first component of the pedestrian route 316 may include a route that includes a sidewalk or a street. The first component of the pedestrian route 316 may indicate a street from which to approach the venue 304 and/or a direction to travel to reach the venue 304 or an entrance of the venue 304.

Figure 4:
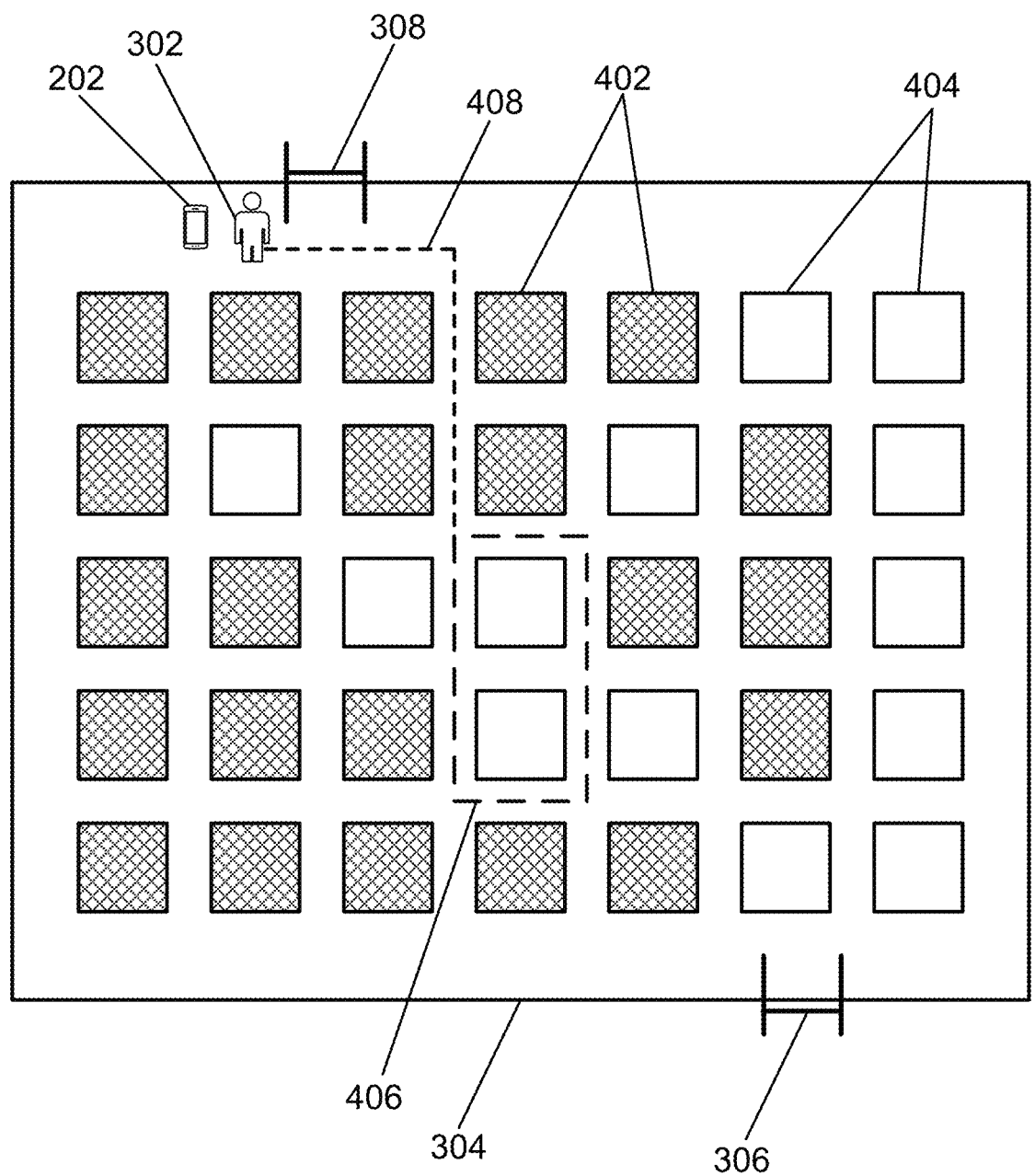
FIG. 4 depicts a determination of a second component of a pedestrian route according to one or more aspects of the disclosure.

FIG. 4 illustrates a determination of a second component of a pedestrian route based on a financial transaction history of a user in accordance with one or more aspects described herein. FIG. 4 shows a user 302 inside of the venue 304. The system 200 may determine that the user 302 has entered the venue 304 through the second entrance 308. Based on the seats associated with the user 302, the system 200 may direct the user 302 to the seats. As many venues are large and complex (e.g., stadiums and large arenas), many individuals may become confused once they enter a venue and may not reach their seats in time for the start of the event. This problem is more likely to occur if the individual is not familiar with the venue (e.g., a first time visitor to a large stadium). In various embodiments, the system 200 may quickly and efficiently route the user 302 to a seating space for the user 302 to increase the likelihood that the user 302 is seated before the event begins.

As shown, FIG. 4 includes a number of occupied seats 402 and a number of unoccupied seats 404. The system may determine the occupied seats 402 and the unoccupied seats 404. In various embodiments, the system 200 may determine that the user 302 purchased assigned seats and may also determine seat assignments for the tickets purchased by the user 302. As an example, the user 302 may be assigned two seats in a seating area 406. Under such a scenario, the system 200 may determine and provide a second component of the pedestrian route 408 to the user 302 to direct the user 302 from the current location of the user 302 (e.g., just inside the second entrance 308) to the seating area 406. The seating area 406 may represent a final location for the user 302.

In various embodiments, to determine the second component of the pedestrian route 406, the system 200 may use information regarding a seating arrangement of the venue 304 such as, for example, information regarding a seating chart for the venue 304 (e.g., a seat map). In various embodiments, the system 200 may determine a density of a crowd within the venue 304 (e.g., a number and/or a concentration of attendees within the venue 304). The system 200 may determine the crowd density in a similar manner as described in relation to FIGS. 2 and 3 (e.g., by receiving location information from the attendees within the venue 304 from electronic devices possessed by the attendees). In various embodiments, the venue 304 may include various sensors (e.g., motion sensors, crowd detection sensors, video monitors) to detect a density of a crowd within the venue 304. The system 200 may adjust the second component of the pedestrian route 408 based on the density of the crowd to route the user 302 to the seating area 406. In various embodiments, the system 200 may determine a number and arrangement of the occupied seats 402 and/or the unoccupied seats 404 based on any crowd density estimate.

In various embodiments, the user 302 may have unassigned seats to the event. Under such a scenario, the system 200 may determine how many unassigned seats may be associated with the user 302 (e.g., based on the number of tickets purchased). The system 200 may determine a seating area of the venue 304 (e.g., the seating area 406) that may accommodate the number of unassigned seats associated with the user 302 based on the crowd density inside of the venue 304 (e.g., based on the number and location of the occupied seats 402 and unoccupied seats 404). The system 200 may then provide a second component of the pedestrian route 408 to the determined seating area 406 based on the determined seating area 406.

In various embodiments, the routing system computing device 208 may provide information regarding the second component of the pedestrian route 408 to the user computing device 202. The information provided to the user computing device 202 may allow the user computing device 202 to audibly, textually, and/or graphically convey the second component of the pedestrian route 408 to the user 202 in manners similar to those described in relation to FIGS. 2 and 3.

In various embodiments, the system 200 and/or the routing system computing device 208 may use any crowd density estimation or determination technique, such as any crowdsensing technique, to determine any of the crowd densities described herein. In various embodiments, an app, associated with the system 200 and/or the routing system computing device 208, operating on an electronic device in possession of an attendee may be used to determine a location of the attendee. In various embodiments, as described herein, the system 200 and/or the routing system computing device 208 may be configured to track locations of electronic devices of individuals near or attending the event using known location tracking techniques.

In various embodiments, the system 200 and/or the routing system computing device 208 may provide the first component of the pedestrian path 316 and the second component of the pedestrian path 408 as a combined pedestrian path. In various embodiments, as the user traverses the pedestrian path, the system 200 and/or the routing system computing device 208 may provide information to update the pedestrian path and presentation thereof on the user computing device 202. In various embodiments, the system 200 and/or the routing system computing device 208 may update and/or modify the pedestrian path as conditions influencing determination of the pedestrian path change—such as for example, as entrances to the venue 304 change, crowd densities change, or as available seating areas (e.g., to accommodate a number of unassigned seats) change.

In various embodiments, the system 200 and/or the routing system computing device 208 may route two or more individuals (or two or more groups of individuals) to a same seating area. For example, in various embodiments, the user 302 may be separated from another individual that the user 302 is to meet at the event. The user 302 may have bought two tickets—one ticket for the user 302 and one ticket for a friend. The user 302 and the friend may not travel together to the venue 304. Under such circumstances, the system 200 and/or the routing system computing device 208 may separately route each of the user 302 and the friend to the seating area 406. Further, the system 200 and/or the routing system computing device 208 may determine the seating area 406 when the seats are unassigned based on the number and size of the separate groups separately arriving to the event but linked through the same purchase of tickets by the user 302.

Figure 5:
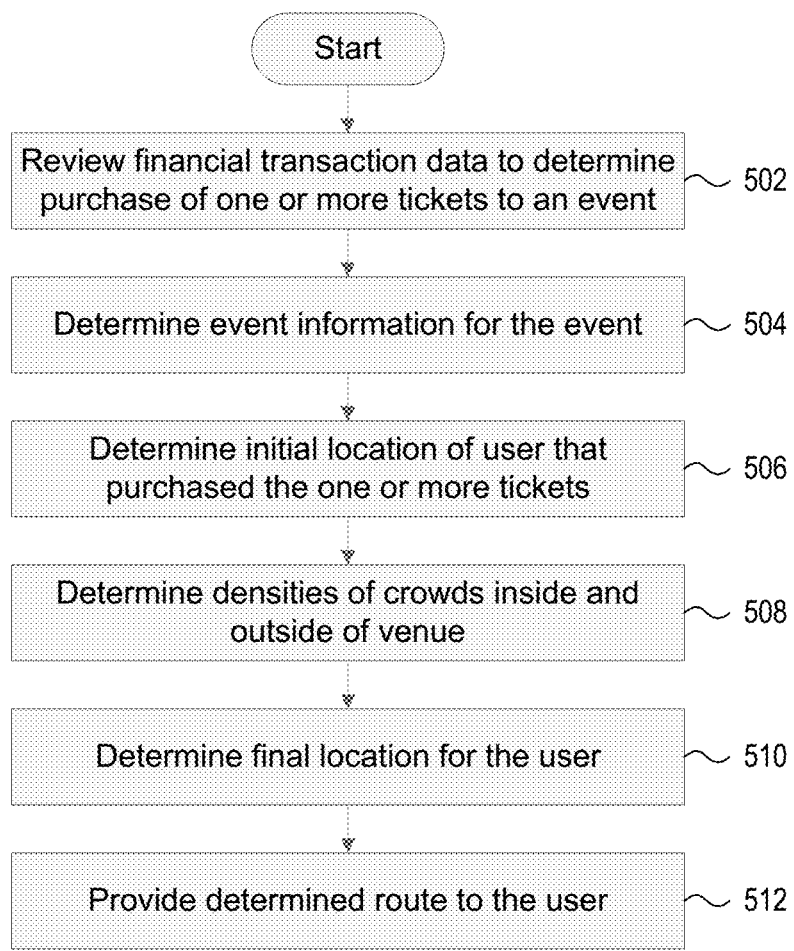
FIG. 5 depicts a flowchart for a first method for determining a pedestrian route according to one or more aspects of the disclosure.

FIG. 5 illustrates an example method 500 for determining a pedestrian route in accordance with one or more aspects described herein. Method 500 may be implemented by a suitable computing system, as described herein. For example, method 500 may be implemented in any suitable computing environment by a computing device and/or combination of computing devices, such as computing devices 101, 105, 107, and 109 of FIG. 1 and/or by one or more of the components depicted in FIG. 2. Method 500 may be implemented in suitable program instructions, such as in software 127, and may operate on data, such as data 129.

At 502, a purchase of one or more tickets to an event may be determined. The purchase of the one or more tickets to the event may be determined based on financial transaction data associated with a financial account provided by a financial institution such as, for example, the financial account of a user (e.g., the user 302) that purchased the one or more tickets.

In various embodiments, the financial data may be credit card transaction data, a bank account transaction data, or other financial account transaction data. The financial data may be reviewed to identify a transaction involving the purchase of the one or more tickets. The financial data may be stored on the user computing device 202 and/or on the financial institution computing device 204.

At 504, event information associated with the event may be determined. The event information may be determined based on the purchase of the one or more tickets to the event. The event information may include a date of the event, a time of the event, a venue for the event, and a number of unassigned seats for the event corresponding to the purchase of the one or more tickets to the event.

In various embodiments, the event information may be determined based on a database storing event information for multiple different events. In various embodiments, the database may be maintained and/or provided through the venue computing device 206. In various embodiments, the event information may be determined based on a billing address associated with the purchase of the one or more tickets. In various embodiments, the event information may be determined based on a transactional code associated with the purchase of the one or more tickets. The transactional code and/or the billing address may identify the venue (e.g., either directly or indirectly) such that a source of event information for the venue may be determined.

In various embodiments, the event information may be determined based on the user that purchased the one or more tickets providing the event information. In various embodiments, the user may provide certain event information through an app operating on the user's computing device. In various embodiments, the event information may be determined based on accessing information stored on a computing device of the user. In various embodiments, the user may allow information stored on the user's phone—including financial transaction data or any event related data—to be accessed such that a determination of a venue or any event information related to the venue may be determined.

At 506, an initial location of the user that purchased the one or more tickets to the event may be determined. The initial location of the user may be determined when the user is determined to be within a predetermined physical proximity to the venue on the date of the event. In various embodiments, the predetermined physical proximity to the venue may be set or customized by the user. The initial location of the user may be determined within a threshold amount of time before the event is scheduled to start (e.g., one hour or two hours before the time of the event or some customizable amount of time set by the user). The initial location of the user may be determined based on the date of the event, the time of the event, the venue for the event.

At 508, one or more crowd densities outside of the venue may be determined. In various embodiments, the crowd densities may be the crowd densities surrounding or in relatively close proximity to any accessible entrance to the venue. As an example, a first density of a first crowd of attendees outside of the venue may be determined and a second density of a second crowd of attendees inside the venue may be determined. In various embodiments, the first density of the first crowd may be determined by tracking locations of electronic devices maintained by members of the first crowd. For example, GPS data and/or other location data may be provided by electronic devices of members of the first crowd that may be used to determine the first density of the first crowd.

In various embodiments, the second density of the second crowd may be determined by tracking locations of electronic devices maintained by members of the second crowd. As with the first crowd, GPS data and/or other location data may be provided by electronic devices of members of the second crowd that may be used to determine the second density of the second crowd. In various embodiments, the first and second crowd densities may be determined based on sensors (e.g., motion sensors) and/or video capture devices located inside of the venue and/or located on the outside of the venue.

At 510, a final location of the user may be determined. The final location of the user may be a seating area inside of the venue that is associated with the user such as, for example, a number of assigned seats associated with the user. The final location of the user may be an unassigned seating area inside of the venue that may accommodate the user including the number of tickets or seats purchased by the user while accounting for any separate groups associated with the user traveling to the seating area separately.

In various embodiments, the final location of the user may be based on the number of seats, whether the seats are assigned or unassigned, the first density of the first crowd of attendees, and the second density of the second crowd of attendees. Based on the initial location of the user and the final location of the user, a pedestrian route for the user from the initial location of the purchaser to a final location inside the venue may be determined.

At 512, the pedestrian route may be provided to the user. In various embodiments, the route may be presented on a user computing device (e.g., the user computing device 202) in the manners described herein. In various embodiments, determination of the pedestrian route may include determining an entrance of the venue to enter and/or determining a street from which to approach the venue. In various embodiments, the final location for the user for seating may be determined based on a seating map of the venue. In various embodiments, any pedestrian route may be updated based on updating the first density of the first crowd and/or updating the second density of the second crowd. The user may use the determined pedestrian route provided to the user to navigate entry into the venue and to navigate to a seating area that may accommodate the user.

In various embodiments, pedestrian traffic patterns associated with the venue for one or more past events at the venue may be determined. Further, a total number of tickets purchased for the event may be monitored. This may allow the pedestrian route to be determined based on the pedestrian traffic patterns associated with the venue for one or more past events and the total number of tickets purchased for the event.

In various embodiments, at 512 one or more instructions may be generated for the user based on the determined pedestrian route. The one or more instructions may be provided to the user and may indicate the determined pedestrian route. As an example, the one or more instructions may specify (e.g., in a step by step manner) how to reach a seating area for the user.

Figure 6:
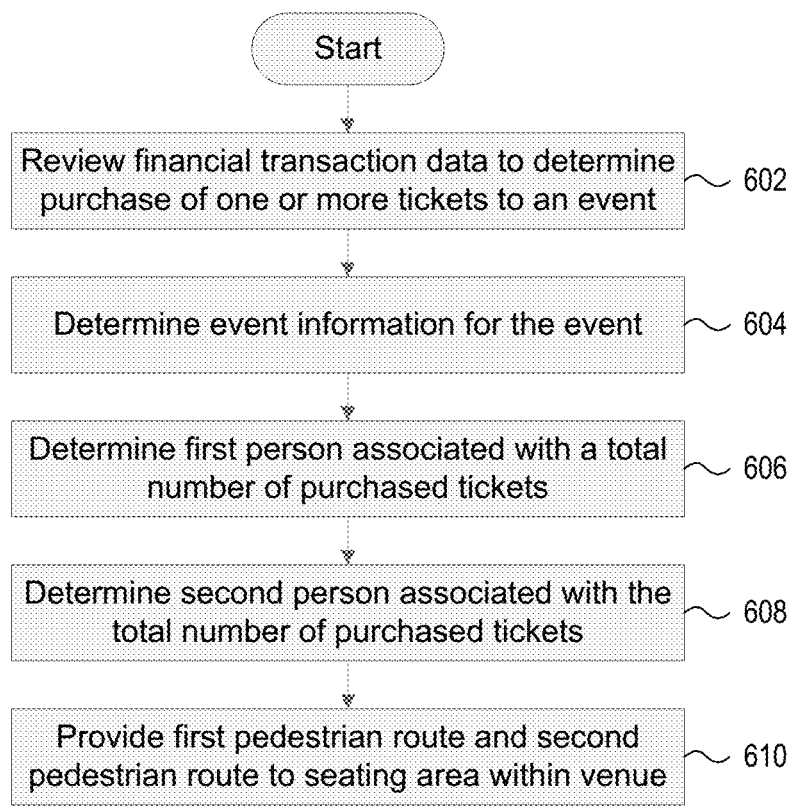
FIG. 6 depicts a flowchart for a second method for determining a pedestrian route according to one or more aspects of the disclosure.

FIG. 6 illustrates an example method 600 for determining a pedestrian route for two or more individuals in accordance with one or more aspects described herein. Method 600 may be implemented by a suitable computing system, as described herein. For example, method 600 may be implemented in any suitable computing environment by a computing device and/or combination of computing devices, such as computing devices 101, 105, 107, and 109 of FIG. 1 and/or by one or more of the components depicted in FIG. 2. Method 600 may be implemented in suitable program instructions, such as in software 127, and may operate on data, such as data 129.

At step 602, financial transaction data may be reviewed to determine a purchase of one or more tickets to an event. The financial transaction data may be data associated with one or more financial accounts of an individual purchasing the one or more tickets to the event.

At 604, event information may be determined. As an example, a type of the event, a date of the event, a venue for the event, and an exact (e.g., total or actual) number of tickets purchased for the event may be determined.

At 606, a first person associated with the exact number of tickets purchased for the event may be determined. Further, a first location of the first person that is within a first threshold distance to the event on the date of the event and within a threshold amount of time to a start of the event may be determined. The first person may be the individual that purchased the tickets to the event.

At 608, a second person associated with the exact number of tickets purchased for the event may be determined. Further, a second location of the second person that is within the first threshold distance to the event on the date of the event and within the threshold amount of time to a start of the event may be determined. The second person may be an individual invited to the event by the first person.

At 610, a first pedestrian route, for the first person, from the first location to a seating area within the venue may be provided and a second pedestrian route, for the second person, from the second location to the seating area within the venue may be provided.

In various embodiments, the first and second pedestrian routes may be based on a seating map of the venue (or other seat assignment and/or arrangement information), an indication of pedestrian traffic within a second threshold distance to the event, an indication of pedestrian traffic inside of the venue, and the exact number of tickets purchased for the event. In various embodiments, the second threshold distance may be greater or less than the first threshold distance.

In various embodiments, the exact number of tickets purchased for the event may match a corresponding number of unassigned seats (e.g., the tickets to the event are for unassigned seats). Under such a scenario, the seating area may be determined based on the seating area including an unoccupied number of physical seats equal to the corresponding number of unassigned seats. In various embodiments, a determination may be made to link or otherwise associate the first person and second person.

In various embodiments, at step 610, the first pedestrian route may be caused to be visually displayed on a first computing device associated with the first person and the second pedestrian route may be caused to be visually displayed on a second computing device associated with the second person. In various embodiments, the first and second pedestrian routes may include textual, graphical, and/or audible information presented to the first person and the second person, respectively. In various embodiments, presentation of the first pedestrian route may be updated as the first person traverses the first pedestrian route and presentation of the second pedestrian route may be updated as the second person traverses the second pedestrian route. The first person and the second person may each use their respective determined pedestrian routes to navigate entry into the venue and to navigate to a seating area that may accommodate the individuals.

In various embodiments, at 610 one or more instructions may be generated for each of the first person and the second person based on the determined pedestrian route for each person. The one or more instructions may be provided to each person and may indicate the determined pedestrian route for that person. As an example, the one or more instructions may specify (e.g., in a step by step manner) how to reach a seating area for the person.

Some aspects described herein may provide benefits by enabling an individual to be automatically routed to a venue and then to a seating area inside of a venue in an efficient manner. The individual may feel less overwhelmed in attempting to reach the venue and the seating area by not having to collect and analyze information from various sources to determine an efficient route for getting to an event on time, thereby increasing a likelihood that the individual reaches the seating area prior to the start of an event.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   determining, by a first computing device and based on financial transaction data associated with a financial account provided by a financial institution, a purchase of one or more tickets to an event;
   determining, by the first computing device and based on the purchase of the one or more tickets to the event, event information associated with the event, the event information comprising:
   a date of the event;
   a time of the event;
   a venue for the event; and
   a number of unassigned seats for the event corresponding to the purchase of the one or more tickets to the event;
   determining, by the first computing device and based on the date of the event, the time of the event, the venue for the event, and when the purchaser is within a predetermined physical proximity to the venue on the date of the event, an initial location of a purchaser of the one or more tickets to the event;
   generating, by electronic devices associated with a first crowd of attendees outside the venue, first location data;
   transmitting, by the electronic devices associated with the first crowd, the first location data to the first computing device;
   determining, by the first computing device and based on the first location data, a first density of the first crowd of attendees outside of the venue;
   generating, by electronic devices associated with a second crowd of attendees inside the venue, second location data;
   transmitting, by the electronic devices associated with the second crowd, the second location data to the first computing device;
   determining, by the first computing device and based on the second location data, a second density of the second crowd of attendees inside the venue;
   determining, by the first computing device and based on the number of unassigned seats, based on the first density of the first crowd of attendees, and based on the second density of the second crowd of attendees, a pedestrian route for the purchaser from the initial location of the purchaser to a final location inside the venue, the final location inside the venue comprising a number of available physical seats matching the number of unassigned seats; and
   generate, by the first computing device, an instruction for the purchaser based on the determined pedestrian route.

2. The method of claim 1, wherein the financial transaction data comprises credit card transaction data.

3. The method of claim 1, wherein determining the event information comprises determining the event information based on a database storing a plurality of event information for a plurality of corresponding events.

4. The method of claim 1, wherein determining the event information comprises determining the event information based on a billing address associated with the purchase of the one or more tickets to the event or a transactional code associated with the purchase of the one or more tickets to the event.

5. The method of claim 1, wherein determining the event information comprises determining the event information based on the purchaser providing the event information.

6. The method of claim 1, wherein determining the event information comprises determining the event information based on access to information stored on a computing device of the purchaser.

7. The method of claim 1, further comprising:
   monitoring, by the first computing device, locations of the electronic devices associated with the first crowd of attendees and locations of the electronic devices associated with the second crowd of attendees.

8. The method of claim 1, wherein determining the second density of the second crowd comprises determining the second density of the second crowd based on sensors located inside of the venue.

9. The method of claim 1, wherein determining the pedestrian route comprises determining an entrance of the venue to enter.

10. The method of claim 1, wherein determining the pedestrian route comprises determining a street from which to approach the venue.

11. The method of claim 1, further comprising determining the final location based on a seating map of the venue.

12. The method of claim 1, further comprising determining pedestrian traffic patterns associated with the venue for a plurality of past events.

13. The method of claim 12, further comprising monitoring a total number of tickets purchased for the event, and determining the pedestrian route based on the pedestrian traffic patterns associated with the venue for the plurality of past events and the total number of tickets purchased for the event.

14. The method of claim 1, further comprising updating the pedestrian route based on updating the first density of the first crowd and updating the second density of the second crowd.

15. One or more non-transitory media storing instructions that, when executed by one or more processors, cause the one or more processors to perform steps comprising:
   determining, based on financial transaction data, a purchase of one or more tickets to an event;
   determining, based on the purchase of the one or more tickets to the event, event information associated with the event, the event information comprising:
   a date of the event;
   a time of the event;
   a venue for the event; and
   a number of unassigned seats at the venue corresponding to the purchase of the one or more tickets to the event;
   determining, based on the date of the event, the time of the event, the venue for the event, and when the purchaser is within a predetermined physical proximity to the venue on the date of the event, an initial location of a purchaser of the one or more tickets to the event;

receiving, from electronic devices associated with a first crowd of attendees outside the venue, first location data, generated by the electronic devices associated with the first crowd;

determining, based on the first location data, a first density of the first crowd of attendees outside of the venue;

receiving, from electronic devices associated with a second crowd of attendees inside the venue, second location data, generated by the electronic devices associated with the second crowd;

determining, based on the second location data, a second density of the second crowd of attendees inside of the venue;

determining, based on the number of unassigned seats, based on the first density of the first crowd of attendees, and based on the second density of the second crowd of attendees, a pedestrian route for the purchaser from the initial location of the purchaser to a final location inside of the venue, the final location inside of the venue comprising a number of available physical seats matching the number of unassigned seats; and providing the pedestrian route to the purchaser as one or more instructions.

16. The one or more non-transitory media of claim 15, wherein the instructions, when executed, further cause:
updating the pedestrian route based on updating the first density of the first crowd and updating the second density of the second crowd.

17. The one or more non-transitory media of claim 15, wherein the instructions, when executed, further cause:
determining the second density of the second crowd based on sensors located inside of the venue.

18. An apparatus comprising:
one or more processors; and
memory storing instructions that, when executed by the one or more processors, cause the apparatus to:
determine, based on financial transaction data, a purchase of one or more tickets to an event;
determine, based on the purchase of the one or more tickets to the event, event information associated with the event, the event information comprising:
a date of the event;
a time of the event;
a venue for the event; and
a number of unassigned seats at the venue corresponding to the purchase of the one or more tickets to the event;
determine, based on the date of the event, the time of the event, the venue for the event, and when the purchaser is within a predetermined physical proximity to the venue on the date of the event, an initial location of a purchaser of the one or more tickets to the event;
receive, from electronic devices associated with a first crowd of attendees outside the venue, first location data, generated by the electronic devices associated with the first crowd;
determine, based on the first location data, a first density of the first crowd of attendees outside of the venue;
receive, from electronic devices associated with a second crowd of attendees inside the venue, second location data, generated by the electronic devices associated with the second crowd;
determine, based on the second location data, a second density of the second crowd of attendees inside of the venue;
determine, based on the number of unassigned seats, based on the first density of the first crowd of attendees, and based on the second density of the second crowd of attendees, a pedestrian route for the purchaser from the initial location of the purchaser to a final location inside of the venue, the final location inside of the venue comprising a number of available physical seats matching the number of unassigned seats; and
provide the pedestrian route to the purchaser as one or more instructions.

19. The apparatus of claim 18, wherein the instructions, when executed by the one or more processors, cause the apparatus to:
update the pedestrian route based on updating the first density of the first crowd and updating the second density of the second crowd.

20. The apparatus of claim 18, wherein the instructions, when executed by the one or more processors, cause the apparatus to:
determine the second density of the second crowd based on sensors located inside of the venue.

* * * * *